United States Patent [19]

Beals

[11] Patent Number: 4,643,396
[45] Date of Patent: Feb. 17, 1987

[54] STAND FOR MOTORIZED SNOW VEHICLE OR THE LIKE

[76] Inventor: Michael Beals, 11081 Little Rice Dam Rd., Tomahawk, Wis. 54487

[21] Appl. No.: 803,057

[22] Filed: Nov. 29, 1985

[51] Int. Cl.⁴ .............................................. B66F 3/00
[52] U.S. Cl. .................................................. 254/116
[58] Field of Search ............................... 254/113–114, 254/116–117, 119–120, 131

[56] References Cited

U.S. PATENT DOCUMENTS

| | | | |
|---|---|---|---|
| D. 184,009 | 12/1958 | Graafsma et al. | |
| 219,089 | 9/1879 | Hart | 254/116 |
| 287,191 | 10/1883 | Swink | 254/114 |
| 345,626 | 7/1886 | Dwiggins | 254/116 |
| 590,969 | 10/1897 | Diffenderfer | 254/114 |
| 647,744 | 4/1900 | Craig | 254/114 X |
| 648,284 | 4/1900 | Omen | 254/114 |
| 1,151,106 | 8/1915 | Johnston | 254/116 |
| 1,404,824 | 1/1922 | Williams | 254/114 |
| 1,433,069 | 10/1922 | Clarke | 254/114 |
| 1,894,293 | 1/1933 | Green | |
| 2,719,696 | 10/1955 | Palka | |
| 3,747,778 | 7/1973 | Collins, Jr. | |
| 3,830,455 | 8/1974 | Brightly | |
| 3,907,254 | 9/1975 | Richards | 254/131 |
| 3,981,372 | 9/1976 | Moreau | |
| 4,420,164 | 12/1983 | Mitchell | |
| 4,457,492 | 7/1984 | Lahti | 254/114 X |

Primary Examiner—Frederick R. Schmidt
Assistant Examiner—Steven P. Schad
Attorney, Agent, or Firm—Isaksen, Lathrop, Esch, Hart & Clark

[57] ABSTRACT

A stand particularly adapted for use with snowmobiles or other snow vehicles to easily and quickly lift one end of the vehicle to allow for cleaning, inspection, or alignment of the continuous tracks used to propel the vehicle. The stand includes a tripod with a lifting lever which lifts the lift rod, and with a locking means to lock the lever in a raised position with the vehicle end elevated.

13 Claims, 3 Drawing Figures

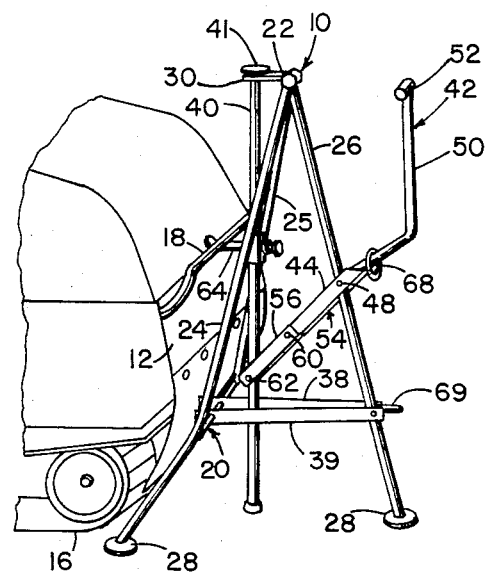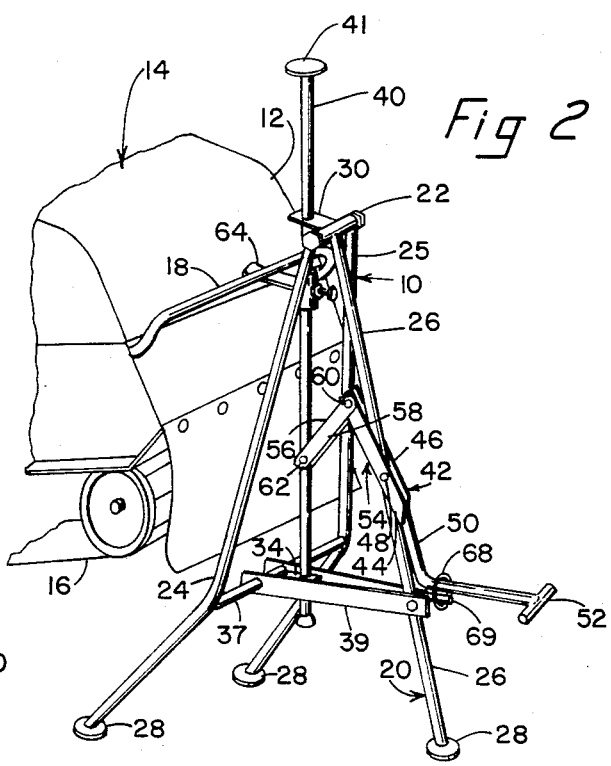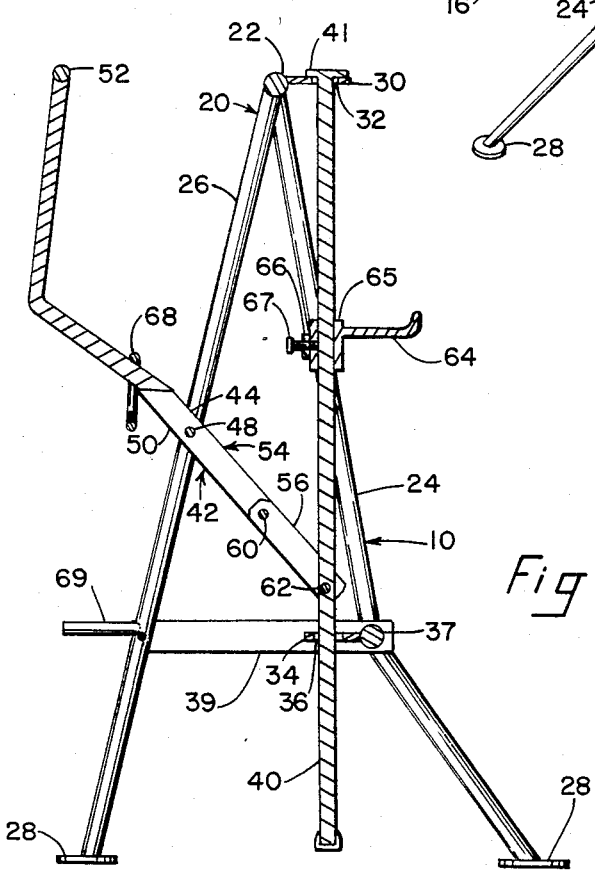

STAND FOR MOTORIZED SNOW VEHICLE OR THE LIKE

TECHNICAL FIELD

This invention relates to stands for motorized snow vehicles or the like and more particularly to stands which both raise an end of the vehicle and support the vehicle end in a raised position off the ground.

BACKGROUND OF THE INVENTION

Motorized snow vehicles are commonly used for transportation and sport. Snowmobiles which use a revolving endless drive belt or track to grip a snow covered surface are particularly popular. While jacks and stands have long been used for lifting or supporting the ends of various other motorized vehicles, these devices are generally not intended for use with snow vehicles. Examples of these standard lifting and support devices are shown in U.S. Pat. No. 1,894,293 to Green which discloses an automobile stand with a vertically adjustable rack portion; U.S. Pat. No. 2,719,696 which discloses a cable and ratchet wheel lifting jack; U.S. Pat. No. 184,009 which shows a design for a vehicle end lift jack; and U.S. Pat. No. 4,420,164 to Mitchell which discloses a dirt bike stand having vertically moving columns controllable through a pivotally mounted lever.

Snowmobile tracks, like other ground-gripping surfaces, must periodically be lifted and supported off the ground for inspection and maintenance. A snowmobile hoist developed for this purpose is shown in U.S. Pat. No. 3,747,778 to Collins, Jr. Because, snowmobiles often require an adjustment or alignment of the revolving track, operators and mechanics find convenient simple and efficient devices to raise the rear end of the snowmobile to allow quick inspection and adjustment in the field. Snowmobile tracks can be elevated by hand by having one or two persons lift one end of the vehicle. The vehicle end can then be held in a raised position either by hand, or by positioning a stand beneath the raised end. Examples of support stands are shown in U.S. Pat. No. 3,830,455 to Brightly and U.S. Pat. No. 3,981,372 to Moreau. Such stands may also be used to support elevated tracks when the vehicle is parked on wet snow or slush. This prevents the ground-gripping tracks from later freezing to the ground. In any case, the effort expended in lifting the end of the vehicle by hand is considerable, and this strenuous and cumbersome task is not welcomed by vehicle users.

SUMMARY OF THE INVENTION

A stand for raising the end of a motorized snow vehicle or the like and supporting the vehicle end in a raised position off the ground includes a frame suitable for standing erect upon the ground; a rod guide on the frame for defining an elongated, generally vertical channel therein; an elongated lift rod mounted in the channel and slideable in the channel; a lever pivotally mounted on the frame at a pivot point located a distance from the lift rod, the lever having a first end which is manually accessible, and a second end generally opposite the pivot point from the first end which is connected to the lift rod so that depression of the first end lifts the lift rod; a vehicle support member mounted on the lift rod so that the vehicle end may be raised and supported above the ground by raising the lift rod; and a manually operable lock which locks the frame to the lever to hold the lever in position with the lift rod raised to a selected height.

It is an object of this invention to provide a stand which may be used to raise and support the end of a snowmobile to allow its tracks to be inspected and maintained.

Another object of this invention is to provide a stand which facilitates adjusting and aligning snowmobile tracks.

Yet onother object of this invention is to provide a stand which aids a user in lifting the end of a vehicle.

Still another object of this invention is to provide a device which is efficient to manufacture.

Other objects, advantages, and features of the present invention will be apparent from the following specification when read in conjunction with the accompanying drawings.

BRIEF DESCRIPTION OF THE DRAWINGS

FIG. 1 is a perspective view of a stand constructed in accordance with this invention showing the stand in a lowered position at the rear end of a snowmobile.

FIG. 2 is a perspective view of the stand of FIG. 1 showing the lift arm in a raised position supporting the rear end of a snowmobile above the ground.

FIG. 3 is a section view of the stand of FIG. 1 taken through the rear leg and the lift rod.

DETAILED DESCRIPTION OF THE PREFERRED EMBODIMENT

A stand for motorized snow vehicles or the like constructed in accordance with this invention is shown generally at 10 in FIG. 1 and FIG. 2. The stand 10 is positioned in FIG. 1 and FIG. 2 at the rear end 12 of snowmobile 14. In FIG. 1 the snowmobile 14 is shown with its track 16 resting on the ground and an end bracket 18 extending outwardly from the vehicle end 12. In FIG. 2 the snowmobile is shown with its rear end 12 raised off the ground and supported in the raised position by stand 10. In this raised position, track 16 is lifted off the ground.

The stand 10 includes a frame 20 suitable for standing erect on the ground. In the preferred emobodiment shown in the figures, the frame includes two front legs 24 and 25 adapted for placement toward the rear end 12 and a rear leg 26 adapted for placement away from the vehicle end 12. The legs 24, 25 and 26 are joined near the top of the frame 20 by a transverse connector 22, and flare outwardly and downwardly therefrom to the bottom of the frame. Consequently, the bottom of the frame shown is tripodic. Moreover the front legs 24 and 25 are preferably angled so that they each have a bottom portion which flares outwardly from its respective top portion. This stand structure is particularly adapted for use near the rear of snowmobiles, such as that shown in FIG. 1 which are recessed near the bottom, because it provides a particularly stable, a wide tripodic base, while still allowing the upper portion of the frame 20 to be placed close to the vehicle end 12. Flat horizontal feet 28 are provided at the bottom of the legs 24, 25 and 26 to allow the base 22 to rest on uneven or soft surfaces.

An upper bearing 30 having a bearing hole 32 is affixed near the top of the frame 20. A lower bearing 34 having a bearing hole 36 is affixed lower on the frame with bearing holes 32 and 36 aligned to define an elongated channel. The upper and lower bearings 30 and 34 together serve as a rod guide and define a generally vertical elongated channel in which a rod may be placed. The channel can, of course, be varied from true vertical, although mechanical advantage will be maximized if the channel is near vertical. In the embodiment shown here, a horizontal bar 37 is secured between the two front legs 24 and 25, and braces 38 and 39 are secured between the bar 37 and the rear leg 26. This structure allows the lower bearing 34 to be securely fixed in place between the braces 38 and 39, and below the upper bearing 30.

An elongated lift rod 40 is mounted within the aligned holes 32 and 36 such that it slides along the longitudinal axis of the channel defined by the holes. The lift rod 40 of the preferred embodiment has an enlarged head 41 to prevent the lift rod from falling out of the channel defined by bearing holes 32 and 36. Preferably, the bearing holes 32 and 36 are round and are vertically aligned forward of the third leg 26; and the lift rod is cylindrical with a generally vertical longitudinal axis and is positioned to pass between the third leg 26 and the vehicle end 12. As described above, bearings 30 and 34 are used in the embodiment described herein as a rod guide. However, it will be evident to those skilled in the art that other rod guide structures such as a single thick bearing or a tubular sheath could function within the scope of this invention to define the channel within which the lift bar 40 may be mounted.

As best shown in FIG. 2, a lever 42 is pivotally mounted to the frame 20. The lever 42 of the preferred embodiment is forked at one end such that it has two tines 44 and 46. The tines 44 and 46 are rigidly secured to the remainder of the lever 42 and are separated so as to allow the rear leg 26 to pass between them. The pivot point is provided by a bolt 48 which passes through the rear leg 26 and the tines 44 and 46. The lever 42 has a first end 50 which extends from the pivot point to an accessible position at which the user may exert a force thereon. In the preferred embodiment shown, the first end 50 extends rearwardly from the rear leg 26, and generally away from the lift rod 40. The first end 50 can be bent upward as shown in the figures and provided with a handle 52 for user manipulation. The second end 54 of lever 42 extends in a direction generally opposite the first end 50 and generally toward the lift rod 40. The second end 54 of the preferred embodiment is split, including the forward portions of the tines 44 and 46.

A linkage is provided for linking the second end 54 of the lever 42 to the lift rod 40 in a manner which allows the lift rod to be raised along the rod guide channel under a force exerted by the user on the handle 52. Inasmuch as the second end 54 rotates about the pivot point of the lever 42 while the lift rod 40 preferably slides in a linear manner along the longitudinal axis of the rod guide channel, direct connection of the second arm to the lift rod 40 would allow little if any movement of the lift rod. Thus, in the preferred embodiment, the second end 54 is connected to the lift rod 40 using two parallel rigid linkage bars 56 and 58. The linkage bars 56 and 58 are pivotably mounted to the second end 54 respectively near the ends of the tines 44 and 46 using respective bolts 60; and the linkage bars 56 and 58 are also pivotably mounted to opposed sides of the lift rod 40 using a single bolt 62. It will be evident to those skilled in the art that other mechanical linkages, such as a single rigid bar, a flexible cable, or a chain might also be used within the scope of this invention to connect the second end 54 of the lever 42 to the lift rod 40. Preferably, the distance between the bolt 48 and the bolt 60 is slightly less than the distance between the pivot point bolt 48 and the lift rod 40. To allow for vertical movability of the lift rod, the effective length of the linking mechanism (e.g. the distance along each linkage bar 56 and 58 between the points at which it is respectively connected to the lever 42 and the lift rod 40) should be greater than the horizontal distance between the lift rod 40 and the point at which the linkage is connected to the lever 42 when the second end 54 of the lever 42 is raised to an elevation equal to that of pivot bolt 48.

A vehicle support member is mounted on the lift rod 40 so that the end of the snowmobile can be raised and supported above the ground by raising the lift rod. The preferred embodiment of the vehicle support member is adapted for use with a vehicle such as snowmobile 14 which has an end bracket 18, and includes an upwardly curved hook member 64. The hook member 64 extends forwardly from the lift rod 40 at an elevation which is below the elevation of the end bracket 18 of the snowmobile when the lift rod 40 is down, as shown in FIG. 1, but which is raised above the rest elevation of the end bracket 18 when the lift rod 40 is raised, as shown in FIG. 2. Consequently, when the lift rod is raised, hook member 64 engages the end bracket 18 and raises the vehicle end 12. The hook member 64 is preferably secured to the front of the lift rod 40 using adjustable tubular collar 65. A nut 66 is welded to the collar 65 and a hole including the threaded center of the nut extends through the collar wall such that bolt 67 may be threaded through the collar wall to engage the lift rod 40. This allows the position of the hook member 64 to be adjusted along the lift rod 40 to allow for end brackets 18 of varying height by selectively loosening and tightening the bolt 66. Adjustability can also be provided by such other structure as a plurality of bolt holes along the length of the lift rod such that a hook member could be selectively bolted and unbolted from the various bolt holes as appropriate.

Stud 69 extends from the rear leg 26 such that when the lift rod 40 is raised, the stud is adjacent to at least a portion of the second end 50 of lever 42. A ring 68 is provided to slide along the second end 50, and is sized such that when the lift rod 40 is raised the ring can also slide over stud 69 to reversibly lock the lever in position. When the ring 68 is positioned around the stud 69 with the lift rod 40 raised, and the user ceases exerting force upon the first end 50, the weight of the lift rod 40 and its supported load presses the ring against the stud. The ring 68 thus functions as a manually operable lock which fastens the lift rod 40 in a raised position. It will be evident to those skilled in the art that other locks such as pins, bolts, straps or conventional latch mechanisms, may be used within the scope of this invention to hold the lever in position with the lift rod raised.

Preferably the frame 20 is made from metal such as steel. Should the bottom of a steel frame become frozen to the ground surface, an upper portion of the stand may be heated to warm the base by conduction and thus free it from the frozen ground. The bearing holes 32 and 36 may be lined with plastic to facilitate the movement of the lift rod 40 therethrough.

The materials, parts and methods of assembly disclosed above are those preferred by the inventor. It is understood that the present invention is not limited to the particular materials, construction, arrangement of parts, and methods illustrated and disclosed above. Instead, it embraces all such modified forms thereof as come within the scope of the following claims.

What is claimed is:

1. A stand for raising the end of a motorized snow vehicle or the like and supporting the vehicle end in a raised position off the ground, comprising:
   (a) a frame including two rigid front legs adapted for placement toward the vehicle end, and a rigid rear leg adapted for placement away from the vehicle end, said legs being joined near the top of the frame and flaring outwardly and downwardly therefrom so that the frame stands erect upon the ground;
   (b) a rod guide on the frame for defining an elongated generally vertical channel therein;
   (c) an elongated lift rod mounted in the channel and slidable in the channel;
   (d) a lever pivotally mounted to the frame at a pivot point located at a distance from the lift rod, the lever having a first end which is manually accessible and pivotable between raised and depressed positions, and a second end generally opposite the pivot point from the first end which is connected to the lift rod so that depression of the first end lifts the lift rod;
   (e) a vehicle support member mounted on and vertically adjustable in position upon the lift rod so that the vehicle end may be raised and suported above the ground by raising the lift rod; and
   (f) a manually operable lock including a rearwardly extending stud formed on the rear leg and a ring entrained on the second end of the lever so that the ring can be placed on the stud to hold the lever to the frame to hold the lever in position with the lift rod raised to a selected height.

2. The stand of claim 1 wherein the frame includes a plurality of rigid legs; and wherein the bottom of at each of the legs has a generally flat horizontal foot for supporting the frame on soft surfaces.

3. The stand of claim 1 wherein two of the three outwardly flaring legs are front legs adapted for placement toward the vehicle end and the third of the outwardly flaring legs is a rear leg adapted for placement away from the vehicle end; and wherein the lever is pivotably mounted to the third leg at a distance from the base with its first end extending from the pivot point generally away from the vehicle end; and wherein the lift rod is positioned between the third leg and the vehicle end.

4. The stand of claim 1 wherein the rod guide means includes a plurality of bearings with holes aligned to define the generally vertical channel.

5. The stand of claim 4 wherein the bearing holes are round and the lift rod is cylindrical.

6. The stand of claim 1 wherein the first end of the lever is bent upward and provided with a handle to facilitate manual operation.

7. The stand of claim 1 wherein the connection linking the second end of the lever to the lift rod comprises at least one rigid linkage bar pivotally connected at its opposite ends to each of the lever and the lift rod.

8. The stand of claim 7 wherein the length of the rigid linkage bar is greater than the horizontal distance between the lift rod and the point at which the linkage bar is connected to the lever when the point of connection to the lever is pivoted to an elevation equal to that of the pivot point.

9. The stand of claim 8 wherein the distance between the pivot point and the point of connection of the rigid lever bar to the lever is less than the horizontal distance between the pivot point and the lift rod.

10. The stand of claim 1 particularly adapted for use with a vehicle having an end bracket wherein the vehicle support member includes an upwardly curved hook member which extends from the lift rod at an elevation at which the hook member is below the bracket when the lift rod is lowered and so that the hook member engages the end bracket to raise the vehicle end when the lift rod is raised.

11. The stand of claim 1 wherein the vehicle support member is secured to the lift rod by an adjustable tubular collar with a threaded hole through which a lock bolt is threaded so that the bolt may be selectively loosened from and tightened to the lift rod to allow the vertical position of the vehicle support member to be adjusted along the lift rod.

12. The stand of claim 1 wherein the frame is made from steel.

13. A stand for raising the end of a motorized snow vehicle or the like and supporting the vehicle end in a raised position off the ground, comprising:
   (a) a frame including two rigid front legs adapted for placement toward the vehicle end, and a rigid rear leg adapted for placement away from the vehicle end, said legs being joined near the top of the frame and flaring generally outwardly and downwardly therefrom so that the frame stands erect with three feet upon the ground, the front legs angled so as to have a bottom portion flaring outward from a top portion so that they may be stably placed at the end of the vehicle, the bottom of each leg having a generally flat horizontal foot for supporting the frame on soft surfaces;
   (b) a rod guide on the frame for defining a generally vertical elongated channel;
   (c) a generally straight, elongated lift rod mounted within the channel and slideable in the channel such that the lift rod may be raised and lowered in a generally vertical direction along the longitudinal axis of said channel;
   (d) a lever pivotally mounted to the rear leg at a pivot point located rearward from the lift rod, said lever having a first end which is manually accessible, and a second end generally opposite the pivot point from the first end which is connected to the lift rod so that depression of the first end lifts the lift rod;
   (e) a rigid bar pivotally connected to both the second end of the lever and to the lift rod such that the lift rod may be raised by lowering the first end of the lever, said rigid bar having a length which is greater than the horizontal distance between the lift rod and the point at which the rigid bar is connected to the lever when said point of connection to the lever is pivoted to an elevation equal to that of the pivot point;
   (f) a vehicle support member mounted on and vertically adjustable on the lift rod so that the vehicle end may be raised and supported above the ground by raising the lift rod; and
   (g) a manually operable lock which locks the frame to the lever to hold the lever in position with the lift rod raised to a selected height.

* * * * *